(12) United States Patent
Maeda et al.

(10) Patent No.: US 12,157,426 B2
(45) Date of Patent: Dec. 3, 2024

(54) METHOD FOR PRODUCING STRUCTURE (71) Applicant: KOBE STEEL, LTD., Hyogo (JP)

(72) Inventors: Yasuhiro Maeda, Kobe (JP); Toru Hashimura, Kobe (JP); Taiki Yamakawa, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 150 days.

(21) Appl. No.: 17/906,253

(22) PCT Filed: Mar. 5, 2021

(86) PCT No.: PCT/JP2021/008749
§ 371 (c)(1),
(2) Date: Sep. 13, 2022

(87) PCT Pub. No.: WO2021/205796
PCT Pub. Date: Oct. 14, 2021

(65) Prior Publication Data
US 2023/0126951 A1 Apr. 27, 2023

(30) Foreign Application Priority Data

Apr. 8, 2020 (JP) .................................. 2020-069868

(51) Int. Cl.
*B21D 39/20* (2006.01)
*B21D 39/04* (2006.01)
(Continued)

(52) U.S. Cl.
CPC ............ *B60R 19/24* (2013.01); *B21D 39/046* (2013.01); *B21D 39/06* (2013.01); *B21D 39/206* (2013.01);
(Continued)

(58) Field of Classification Search
CPC .............. Y10T 29/4994; B60R 19/023; B21D 39/046; B21D 39/203; B21D 39/206; B21D 53/88; B62D 65/16
See application file for complete search history.

(56) References Cited

U.S. PATENT DOCUMENTS

| 4,422,317 A | * | 12/1983 | Mueller | ............... | B21D 39/203 |
| | | | | | 72/58 |
| 10,926,314 B2 | | 2/2021 | Maeda et al. | | |

(Continued)

FOREIGN PATENT DOCUMENTS

| DE | 2714757 A1 | * | 10/1977 |
| EP | 3 604 045 A1 | | 2/2020 |

(Continued)

OTHER PUBLICATIONS

The extended European search report issued by the European Patent Office on Jul. 11, 2023, which corresponds to European Patent Application No. 21785475.1-1103 and is related to U.S. Appl. No. 17/906,253.
Notification of Transmittal of Translation of the International Preliminary Report on Patentability and Translation of Written Opinion of the International Searching Authority; PCT/JP2021/008749; mailed on Oct. 20, 2022.

*Primary Examiner* — Jermie E Cozart
(74) *Attorney, Agent, or Firm* — Studebaker & Brackett PC (57) ABSTRACT

A joining method of a structure includes preparing a first member including a first portion provided with a first hole and a second portion provided with a second hole, a second member, a die, and an elastic member, inserting the second member into the first hole, inserting the elastic member into the second member, in a state where one end of the second member in an axial direction is located between the first portion and the second portion, compressing and expanding (Continued)

the elastic member in the axial direction, thereby expanding and deforming the second member at a portion passing through the first hole to be swaged and joined to the first portion. The die includes a support surface for applying a compressive force from the die to the elastic member through the second hole. The support surface is perpendicular to an axial direction of the elastic member.

6 Claims, 8 Drawing Sheets

(51) Int. Cl.
*B21D 39/06* (2006.01)
*B21D 53/88* (2006.01)
*B60R 19/24* (2006.01)
*B60R 19/02* (2006.01)
*B62D 65/16* (2006.01)

(52) U.S. Cl.
CPC ............ *B21D 53/88* (2013.01); *B21D 39/203* (2013.01); *B60R 19/023* (2013.01); *B62D 65/16* (2013.01); *Y10T 29/4994* (2015.01)

(56) References Cited

U.S. PATENT DOCUMENTS

| | | |
|---|---|---|
| 10,974,673 B2 | 4/2021 | Hashimura et al. |
| 11,472,359 B2 | 10/2022 | Yamakawa et al. |
| 2018/0015527 A1 | 1/2018 | Maeda et al. |
| 2018/0272414 A1 | 9/2018 | Maeda et al. |
| 2019/0375355 A1 | 12/2019 | Maeda et al. |
| 2020/0406844 A1 | 12/2020 | Yamakawa et al. |
| 2021/0009058 A1 | 1/2021 | Hashimura et al. |

FOREIGN PATENT DOCUMENTS

| | | |
|---|---|---|
| JP | S51-133170 A | 11/1976 |
| JP | H04-89144 A | 3/1992 |
| JP | 2016-147309 A | 8/2016 |
| JP | 6573517 B2 | 9/2019 |
| WO | 2017/056783 A1 | 4/2017 |
| WO | 2018/168841 A1 | 9/2018 |
| WO | 2019/176371 A1 | 9/2019 |

\* cited by examiner

METHOD FOR PRODUCING STRUCTURE

CROSS-REFERENCE TO RELATED APPLICATIONS

This is a national phase application in the United States of International Patent Application No. PCT/JP2021/008749 with an international filing date of Mar. 5, 2021, which claims priorities of Japanese Patent Applications 2020-069868 filed on Apr. 8, 2020 the contents of which are incorporated herewith by reference.

TECHNICAL FIELD

The present invention relates to a method for producing a structure.

BACKGROUND ART

JP 6573517 B discloses a method of swaging and joining a bumper beam and a bumper stay using rubber. Specifically, rubber is disposed between a front inclined wall extending obliquely with respect to an axial direction of the bumper stay and a plunger. Next, the plunger driven by a press device applies a compressive force in the axial direction of the bumper stay and elastically deforms the rubber outward from the axis. This expands and deforms the bumper stay to swage and join the bumper stay to the bumper beam.

SUMMARY OF THE INVENTION

Technical Problems

When rubber is compressed, a plunger applies a compressive force in an axial direction of a bumper stay to the rubber. On the other hand, a front inclined wall applies a force to the rubber in a direction orthogonal to a direction in which the front inclined wall extends, that is, in an oblique direction with respect to the axial direction. As a result, the rubber is not appropriately compressed in the axial direction of the rubber, and the rubber may unintentionally deform. Unintended deformation of the rubber may cause unintended deformation of the bumper stay.

An object of the present invention is to provide a joining method of a structure capable of preventing unintended deformation in the structure.

One aspect of the present invention provides a joining method of a structure, the joining method including: preparing a first member including a first portion provided with a first hole and a second portion provided with a second hole facing the first hole, a second member that is hollow, a die having a shape along the second portion of the first member, and an elastic member, disposing the first member in the die, inserting the second member into the first hole of the first member, inserting the elastic member into the second member, and, in a state where one end of the second member in an axial direction is located between the first portion and the second portion of the first member, compressing the elastic member in the axial direction to expand the elastic member from inside to outside, thereby expanding and deforming the second member at a portion passing through the first hole of the first member to be swaged and joined to the first portion, in which the die includes a support surface for applying a force from the die to the elastic member through the second hole, and the support surface is perpendicular to an axial direction of the elastic member.

Perpendicular is not limited to perpendicular in a strict sense. In other words, the support surface does not need to be strictly perpendicular to the axial direction of the second member. Perpendicular includes strictly perpendicular and a form slightly deviated from strictly perpendicular within a range where deformation of the structure is allowed.

According to this joining method, the support surface provided in the die is perpendicular to the axial direction of the elastic member, and thus, the elastic member receives a force in a direction along the axial direction from the support surface when the elastic member is compressed. Thus, regardless of a shape of the first member, a force in the direction different from the axial direction is prevented from acting on the elastic member, so that the elastic member is prevented from unintentionally deforming. This results in making it possible to prevent occurrence of unintended deformation in the structure in which the first member and the second member are joined.

The die may include a die body and a support member protruding from the die body and including the support surface, and the support member may be inserted into the second hole when the first member is disposed in the die.

According to this joining method, when the first member is disposed in the die, the support member of the die is inserted into the second hole of the first member, so that the first member can be easily positioned with respect to the die.

The joining method may further include preparing a core member to be disposed between the elastic member and the support surface and integrated with the elastic member, and inserting the core member into the second member before the elastic member is inserted into the second member, in which the core member is formed so as to be gradually thinner toward an end portion on a side of the support surface.

According to this joining method, the core member is formed so as to be gradually thinner toward the end portion on the support surface side, so that it is easy to insert the core member and the elastic member into the second member.

The first member may be a bumper beam, and the second member may be a bumper stay.

According to the present invention, in a joining method of a structure, unintended deformation of the structure can be prevented.

DESCRIPTION OF EMBODIMENT

Embodiments of the present invention will be described below with reference to the accompanying drawings.

First Embodiment

Figure 1:
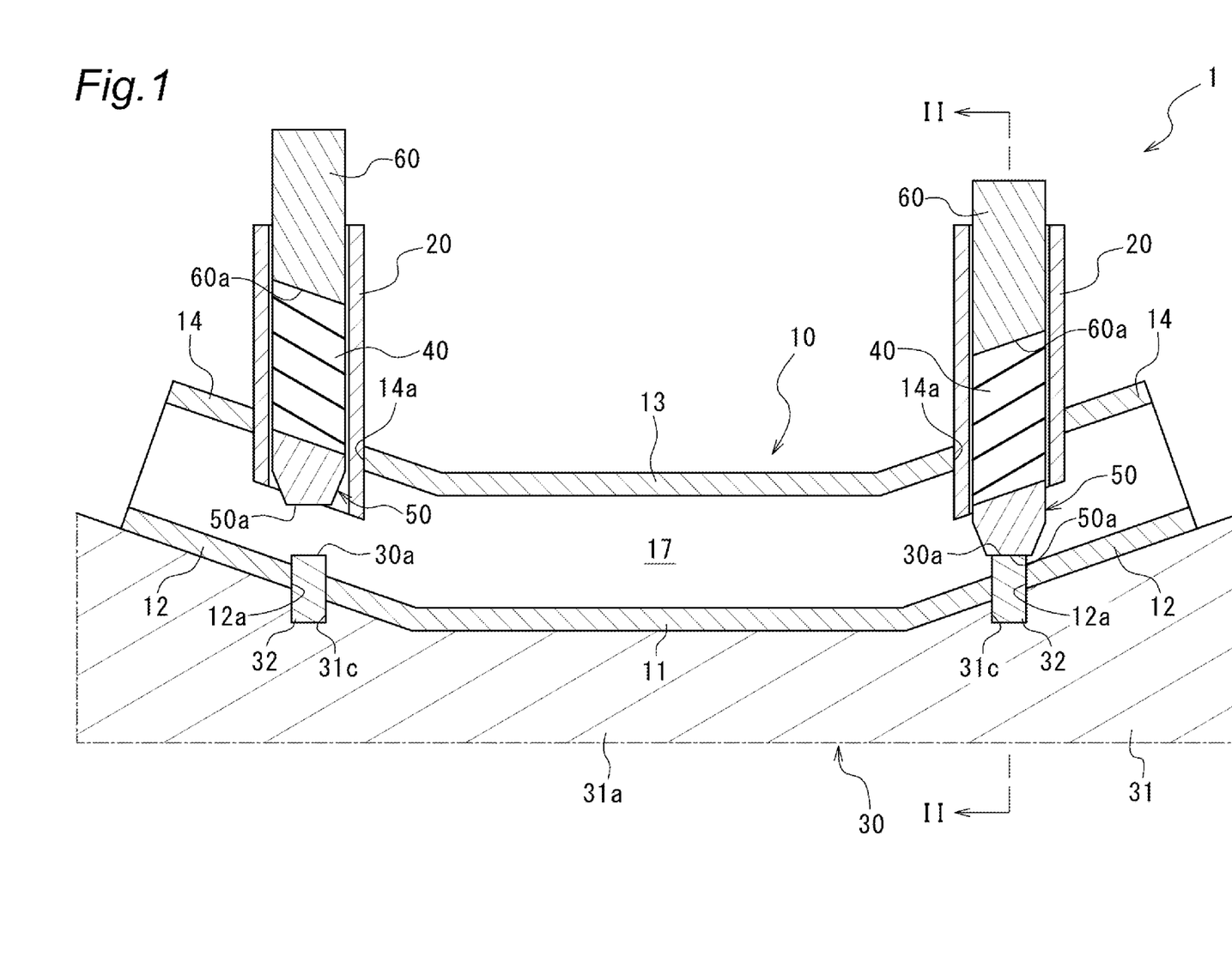
FIG. 1 is a cross-sectional view of a bumper reinforcement according to a first embodiment of the present invention before swaging and joining.
Figure 2:
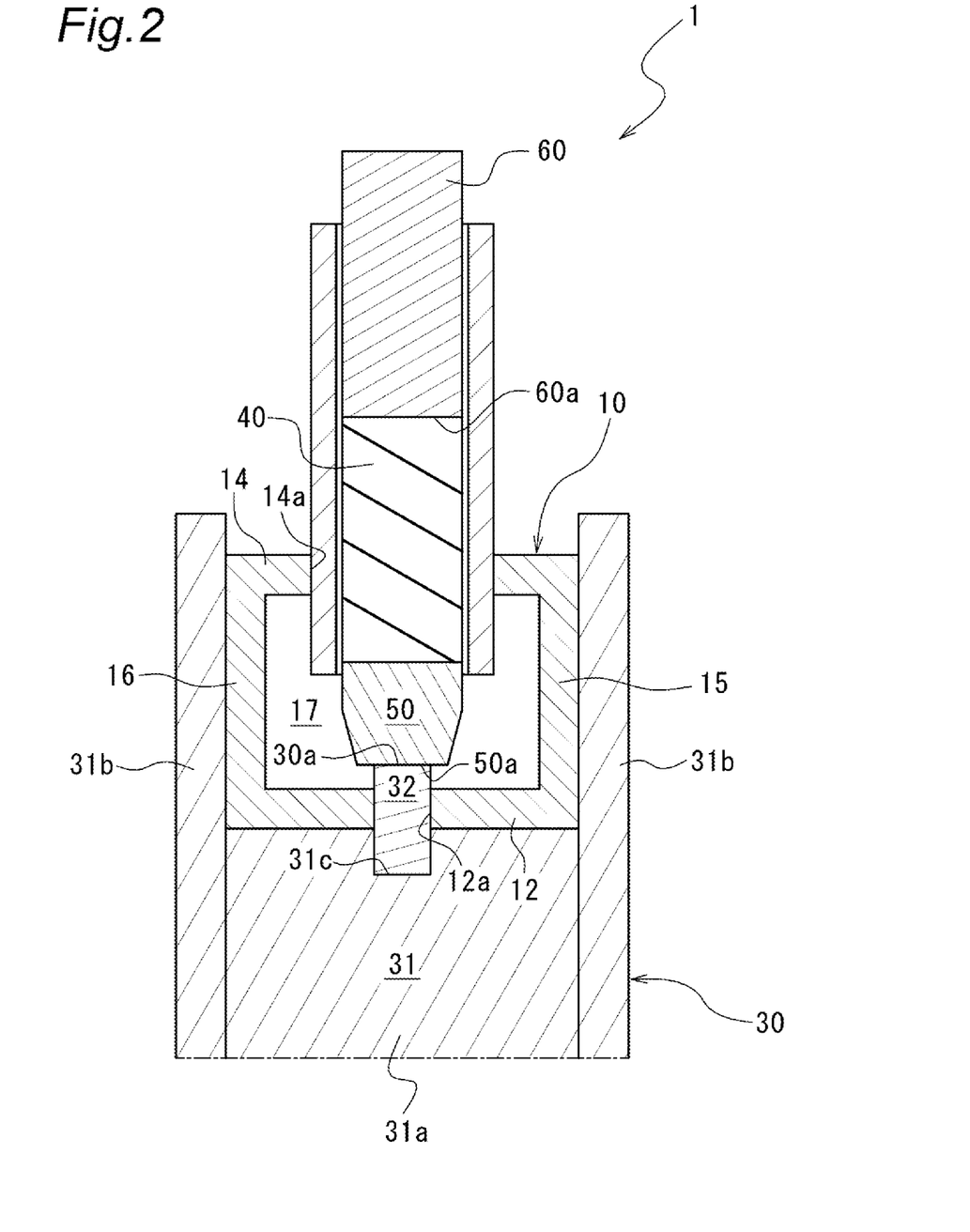
FIG. 2 is a cross-sectional view taken along line II-II of FIG. 1.

The present embodiment relates to a joining method of a bumper reinforcement 1. A structure of each component to be used in the joining method of the present embodiment will be described with reference to FIGS. 1 and 2. FIG. 1 is a cross-sectional view of the bumper reinforcement 1 of the present embodiment before swaging and joining. FIG. 2 is a cross-sectional view taken along line II-II of FIG. 1.

The bumper reinforcement 1 of the present embodiment is attached to a front of a body structure (not illustrated) of a vehicle to protect the vehicle from impact. The bumper reinforcement 1 of the present embodiment is an example of a structure according to the present invention.

Referring to FIGS. 1 and 2, the bumper reinforcement 1 of the present embodiment includes a bumper beam 10 and a pair of bumper stays 20. The bumper beam 10 of the present embodiment is an example of a first member according to the present invention. Each bumper stay 20 of the present embodiment is an example of a second member according to the present invention.

Referring to FIG. 1, the bumper beam 10 includes a front wall 11, a front inclined wall 12, a rear wall 13 and a rear inclined wall 14.

Referring to FIG. 1, the front wall 11 has a plate shape extending in a horizontal direction in a state where the bumper reinforcement 1 is attached to the front of the vehicle body structure of the vehicle (hereinafter, referred to as an attached state). The front wall 11 is disposed on a front side in the attached state.

The front inclined wall 12 has a plate shape extending obliquely from each end in a longitudinal direction of the front wall 11. In the attached state, the front inclined wall 12 extends obliquely rearward from each end in the longitudinal direction of the front wall 11 toward the outside in the longitudinal direction. The front inclined walls 12 is provided with a circular small diameter hole 12a. The small diameter hole 12a of the present embodiment is formed so that the bumper stay 20 cannot pass through. The front inclined wall 12 of the present embodiment is an example of a second portion according to the present invention. The small diameter hole 12a of the present embodiment is an example of a second hole according to the present invention.

The rear wall 13 has a plate shape extending in the horizontal direction in the attached state. The rear wall 13 is disposed on a rear side, with a space from the front wall 11 in the attached state.

The rear inclined wall 14 has a plate shape inclined from each end in the longitudinal direction of the rear wall 13. In the attached state, the rear inclined wall 14 extends obliquely rearward from each end in the longitudinal direction of the rear wall 13 toward the outside in the longitudinal direction. The inclined walls 14 is provided with a circular large diameter hole 14a. The large diameter hole 14a has a shape similar to an outer shape of the bumper stay 20 and is formed to be slightly larger than an outer shape of the bumper stay 20 to such an extent that the bumper stay 20 can pass through. The rear inclined wall 14 of the present embodiment is an example of a first portion according to the present invention. The large diameter hole 14a of the present embodiment is an example of a first hole according to the present invention.

The small diameter hole 12a of the front inclined wall 12 and the large diameter hole 14a of the rear inclined wall 14 are disposed to face each other. The small diameter hole 12a of the front inclined wall 12 and the large diameter hole 14a of the rear inclined wall 14 are coaxially disposed. A diameter of the small diameter hole 12a of the front inclined wall 12 is smaller than a diameter of the large diameter hole 14a of the rear inclined wall 14.

Referring to FIG. 2, the bumper beam 10 includes an upper wall 15 connecting an upper end of the front inclined wall 12 and an upper end of the rear inclined wall 14, and a lower wall 16 connecting a lower end of the front inclined wall 12 and a lower end of the rear inclined wall 14. Although not illustrated, the upper wall 15 connects an upper end of the front wall 11 (illustrated in FIG. 1) and an upper end of the rear wall 13 (illustrated in FIG. 1). Similarly, although not illustrated, the lower wall 16 connects a lower end of the front wall 11 and a lower end of the rear wall 13. The upper wall 15 and the lower wall 16 have a plate shape extending in the horizontal direction in the attached state.

Referring to FIGS. 1 and 2, the bumper beam 10 is hollow with a space portion 17 defined by the front wall 11, the front inclined wall 12, the rear wall 13, the rear inclined wall 14, the upper wall 15, and the lower wall 16. The bumper beam 10 of the present embodiment is formed of high tensile strength steel.

Referring to FIGS. 1 and 2, the bumper stay 20 of the present embodiment has a cylindrical shape extending in a front-rear direction in the attached state. The bumper stay 20 is joined to the bumper beam 10 at an end portion on one side (lower side in FIG. 1) in the axial direction. An end portion on one side in the axial direction of the bumper stay 20 is inclined with respect to the axial direction of the bumper stay 20 so as to correspond to an inclination of the front inclined wall 12 of the bumper beam 10. Further, the end portion on one side in the axial direction of the bumper stay 20 is located between the front inclined wall 12 and the rear inclined wall 14 in a state where the bumper stay 20 is joined to the bumper beam 10 (hereinafter, referred to as a joined state.). In other words, the end portion on one side in the axial direction of the bumper stay 20 is located in the space portion 17 of the bumper beam 10 in the joined state. In other words, the bumper stay 20 of the present embodiment does not penetrate the bumper beam 10. The bumper stay 20 of the present embodiment is an extruded material made of an aluminum alloy.

In the present embodiment, a die 30, rubber 40, a core 50, and a plunger 60 are used for swaging and joining the bumper beam 10 and the bumper stay 20.

Referring to FIG. 1, the die 30 includes a die body 31 and a pin 32 attached to the die body 31. The pin 32 of the present embodiment is an example of a support member according to the present invention.

The die body 31 is constituted such that the bumper beam 10 is fitted thereto. Specifically, as illustrated in FIG. 2, the die body 31 includes a lower die 31a provided along the front wall 11 and the front inclined wall 12 of the bumper beam 10, and an outer frame 31b provided along the upper wall 15 and the lower wall 16 of the bumper beam 10. A fitting hole 31c into which the pin 32 can be fitted is provided in the lower die 31a of the die body 31.

The pin 32 of the present embodiment has a columnar shape. The pin 32 is provided so as to protrude from a surface of the die body 31. The outer shape of the pin 32 of the present embodiment is formed to be slightly smaller than a shape of the small diameter hole 12a of the bumper beam 10 to such an extent that the pin can be inserted into the small diameter hole 12a of the bumper beam 10. An end portion on one side (upper portion in FIG. 1) in the axial direction of the pin 32 has a support surface 30a perpendicular to the axial direction of the pin 32.

The rubber 40 of the present embodiment has a columnar shape. An outer shape of the rubber 40 is formed to be slightly smaller than an inner shape of the bumper stay 20 to such an extent that the rubber can be inserted into the bumper stay 20. Each end in the axial direction of the rubber 40 has flat surfaces inclined with respect to the axial direction of the rubber 40 so as to correspond to a shape of the rear inclined wall 14 of the bumper beam 10. As a material of the rubber 40, for example, it is preferable to use any one of urethane rubber, chloroprene rubber, CNR rubber (chloroprene rubber+nitrile rubber), and silicone rubber. Hardness of the rubber 40 is preferably equal to or greater than 30 in Shore A. The rubber 40 of the present embodiment is an example of an elastic member according to the present invention.

The core 50 of the present embodiment has a substantially truncated cone shape. The core 50 is disposed between the rubber 40 and the die 30. An end portion on one side (upper side in FIG. 1, that is, rubber 40 side) in the axial direction of the core 50 has a flat surface inclined with respect to the axial direction so as to correspond to a shape of an end surface of the rubber 40. An end portion on the other side (in FIG. 1, lower side, that is, the die 30 side) in the axial direction of the core 50 has a pressing surface 50a perpendicular to the axial direction of the core 50 so as to correspond to a shape of the support surface 30a of the pin 32. An area of the pressing surface 50a of the core 50 is larger than an area of the support surface 30a of the pin 32. The core 50 is formed so as to be gradually thinner from one side (rubber 40 side) toward the other side (die 30 side) in the axial direction. The core 50 of the present embodiment is an example of a core member according to the present invention.

The plunger 60 of the present embodiment is attached to a press device (not illustrated) and is driven by the press device to compress the rubber 40. The plunger 60 has a pressing surface 60a inclined with respect to the axial direction of the rubber 40 so as to correspond to the shape of the end surface of the rubber 40.

In the present embodiment, the rubber 40, the core 50, and the plunger 60 are integrated structure.

(Joining Method of Bumper Reinforcement 1)

Figure 3:
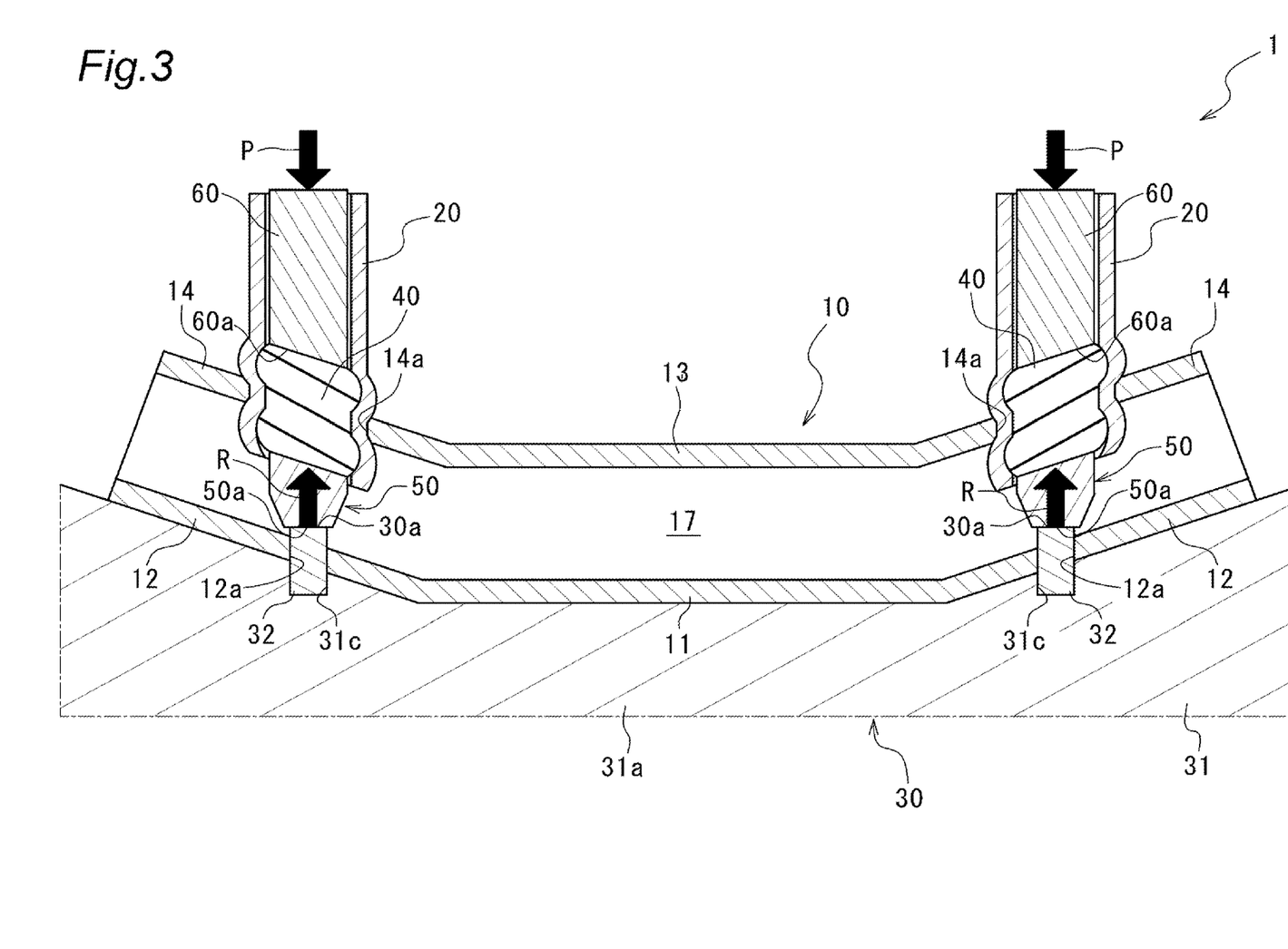
FIG. 3 is a cross-sectional view of the bumper reinforcement according to the first embodiment during swaging and joining.
Figure 4:
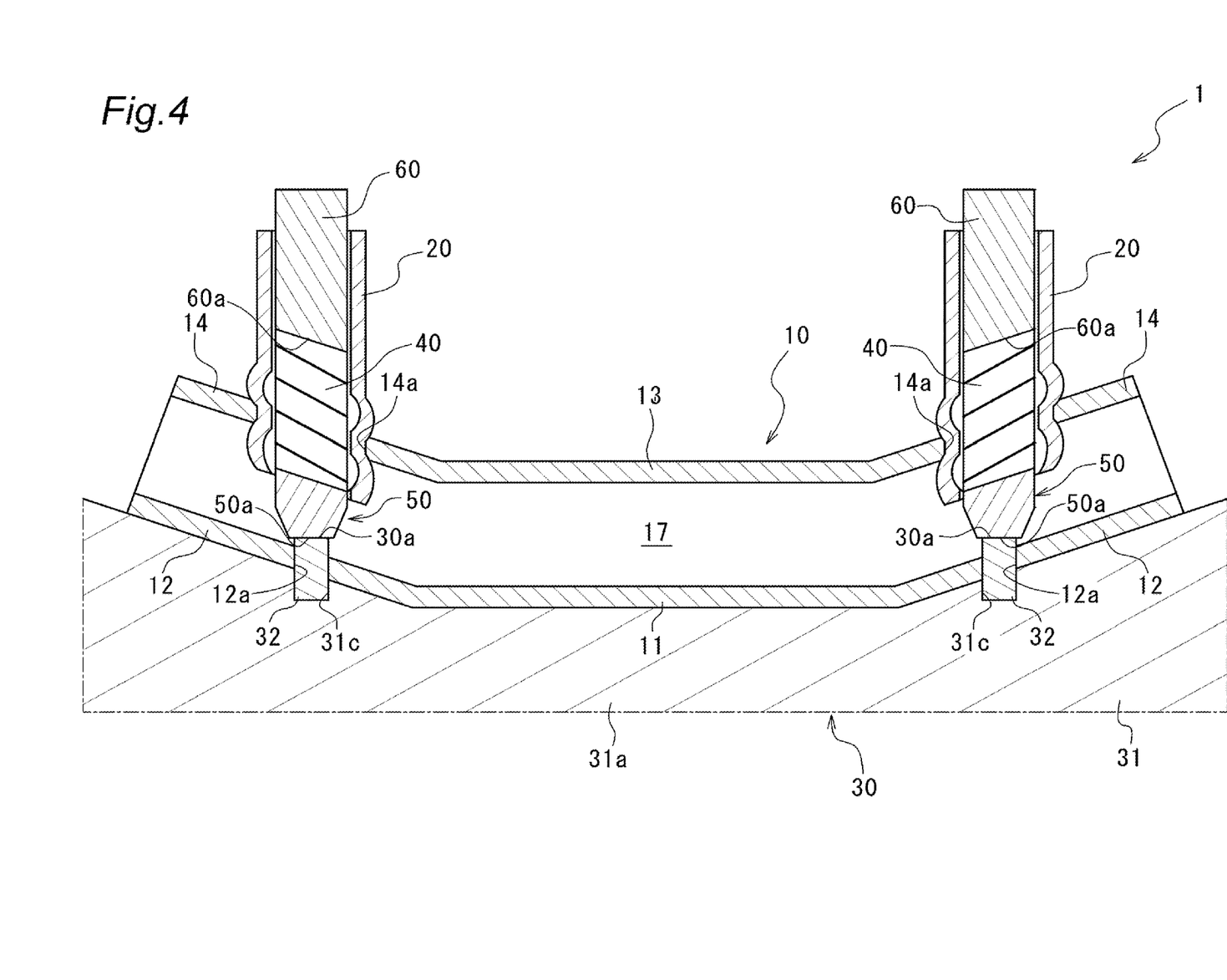
FIG. 4 is a cross-sectional view of the bumper reinforcement according to the first embodiment after swaging and joining.

A joining method of the bumper reinforcement 1 of the present embodiment will be described below with reference to FIGS. 1 to 4. FIG. 3 is a cross-sectional view of the bumper reinforcement 1 of the present embodiment during swaging and joining. FIG. 4 is a cross-sectional view of the bumper reinforcement 1 of the present embodiment after swaging and joining.

First, as illustrated in FIGS. 1 and 2, the bumper beam 10, the bumper stay 20, the die 30, the rubber 40, the core 50, and the plunger 60 having the above-described structures are prepared. In this event, the pin 32 is fitted into the fitting hole 31c of the die body 31 of the die 30, and the pin 32 is attached to the die body 31 in advance. The bumper beam 10 is then disposed in the die 30. In this event, the bumper beam 10 is positioned with respect to the die 30 by inserting the pin 32 of the die 30 into the small diameter hole 12a of the bumper beam 10. In the present embodiment, in a state where the bumper beam 10 is disposed in the die 30, the support surface 30a of the die 30 is located inside the bumper beam 10.

Thereafter, the bumper stay 20 is inserted into the large diameter hole 14a of the bumper beam 10. In this event, the bumper stay 20 is inserted into the bumper beam 10 until an end portion on one side (lower portion in FIG. 1) in the axial direction of the bumper stay 20 is located between the front inclined wall 12 and the rear inclined wall 14. In other words, the bumper stay 20 is disposed such that an end portion on one side in the axial direction of the bumper stay 20 does not abut on the front inclined wall 12 of the bumper beam 10. Then, the core 50, the rubber 40, and the plunger 60 are inserted into the bumper stay 20. In this event, the support surface 30a of the pin 32 is perpendicular to the axial direction of the bumper stay 20 and the axial direction of the rubber 40.

After the core 50, the rubber 40, and the plunger 60 are inserted into the bumper stay 20, as illustrated in FIG. 3, the rubber 40 is compressed in the axial direction by the core 50 and the plunger 60. When the rubber 40 is compressed in the axial direction (compression direction), the rubber 40 expands in a direction orthogonal to the compression direction, thereby the bumper stay 20 expands and deforms. The bumper stay 20 is swaged and joined to the rear inclined wall 14 of the bumper beam 10 by this expansion and deformation.

During swaging and joining, a press load P in the axial direction of the rubber 40 is applied to the plunger 60 from a press device (not illustrated). On the other hand, a reaction force R corresponding to the press load P acts on the core 50 from the support surface 30a of the pin 32. The support surface 30a of the pin 32 is perpendicular to the axial direction of the rubber 40, and thus, the reaction force R mainly includes a force of the axial component of the rubber 40. When the press load P acts on the rubber 40 via the plunger 60 and the reaction force R from the support surface 30a acts on the rubber 40 via the core 50, the compressive force in the axial direction of the rubber 40 acts on the rubber 40.

After the swaging and joining, as illustrated in FIG. 4, the compression of the rubber 40 by the plunger 60 and the core 50 is released. The rubber 40 released from the compression is restored to its original shape by its own elastic force. Thus, the rubber 40 can be easily removed from the bumper stay 20.

The joining method of the bumper reinforcement 1 according to the present embodiment has the following operational effects.

(1) In the present embodiment, when the rubber 40 is compressed, a force acts on the rubber 40 from the die 30 through the small diameter hole 12a. Specifically, as a result of the support surface 30a of the pin 32 that passes through the small diameter hole 12a applying a reaction force R corresponding to the press load P to the rubber 40, the force acts on the rubber 40. In addition, the support surface 30a of the pin 32 is perpendicular to the axial direction of the rubber 40, and thus, the force in the axial direction acts on the rubber 40. This results in making it possible to prevent a directional component other than the axial component of the rubber 40 from being included in the force to act on the rubber 40, so that unintended deformation of the rubber 40 is prevented. As a result, unintended deformation of the bumper reinforcement 1 can be prevented, so that it is possible to fit the bumper beam 10 and the bumper stay 20 with high accuracy and improve joining strength.

(2) In a case where the bumper beam 10 applies a reaction force corresponding to the press load P to the rubber 40, a direction of the force applied to the rubber 40 changes depending on the shape of the bumper beam 10. For example, in a case where the front inclined wall 12 extending obliquely with respect to the axial direction of the rubber 40 applies a reaction force corresponding to the press load P to the rubber 40 as in the present embodiment, the reaction force is directed in a direction inclined with respect to the axial direction of the rubber 40. Thus, unintended deformation may occur in the rubber 40, and unintended deformation may occur in the bumper reinforcement 1. On the other hand, in the present embodiment, the support surface 30a provided on the die 30 applies a reaction force corresponding to the press load P to the rubber 40, so that regardless of the shape of the bumper beam 10, a compressive force in the axial direction can be applied to the rubber 40, and unintended deformation of the bumper reinforcement 1 can be prevented.

(3) In the present embodiment, the rubber 40 has isotropic deformability, and thus, the bumper stay 20 can uniformly expand and deform. It is therefore possible to reduce local application to the bumper stay 20 and prevent local deformation of the bumper stay 20. Thus, as compared with other joining methods, the bumper beam 10 and the bumper stay 20 can be fitted with high accuracy, and the joining strength can be improved.

(4) In the present embodiment, when the bumper beam 10 is disposed in the die 30, the pin 32 of the die 30 is inserted into the small diameter hole 12a of the bumper beam 10, so that the bumper beam 10 can be easily positioned with respect to the die 30.

(5) In the present embodiment, the core 50, the rubber 40, and the plunger 60 are integrated structure, and the core 50 is formed so as to be gradually thinner from one side to the other side in the axial direction, so that it is easy to insert the core 50, the rubber 40, and the plunger 60 into the bumper stay 20.

(6) In the present embodiment, the small diameter hole 12a provided in the front inclined wall 12 is smaller than the large diameter hole 14a provided in the rear inclined wall 14, so that strength of the front inclined wall 12 can be secured as compared with a case where a hole having the same size as the large diameter hole 14a is provided in the front inclined wall 12.

Figure 5:
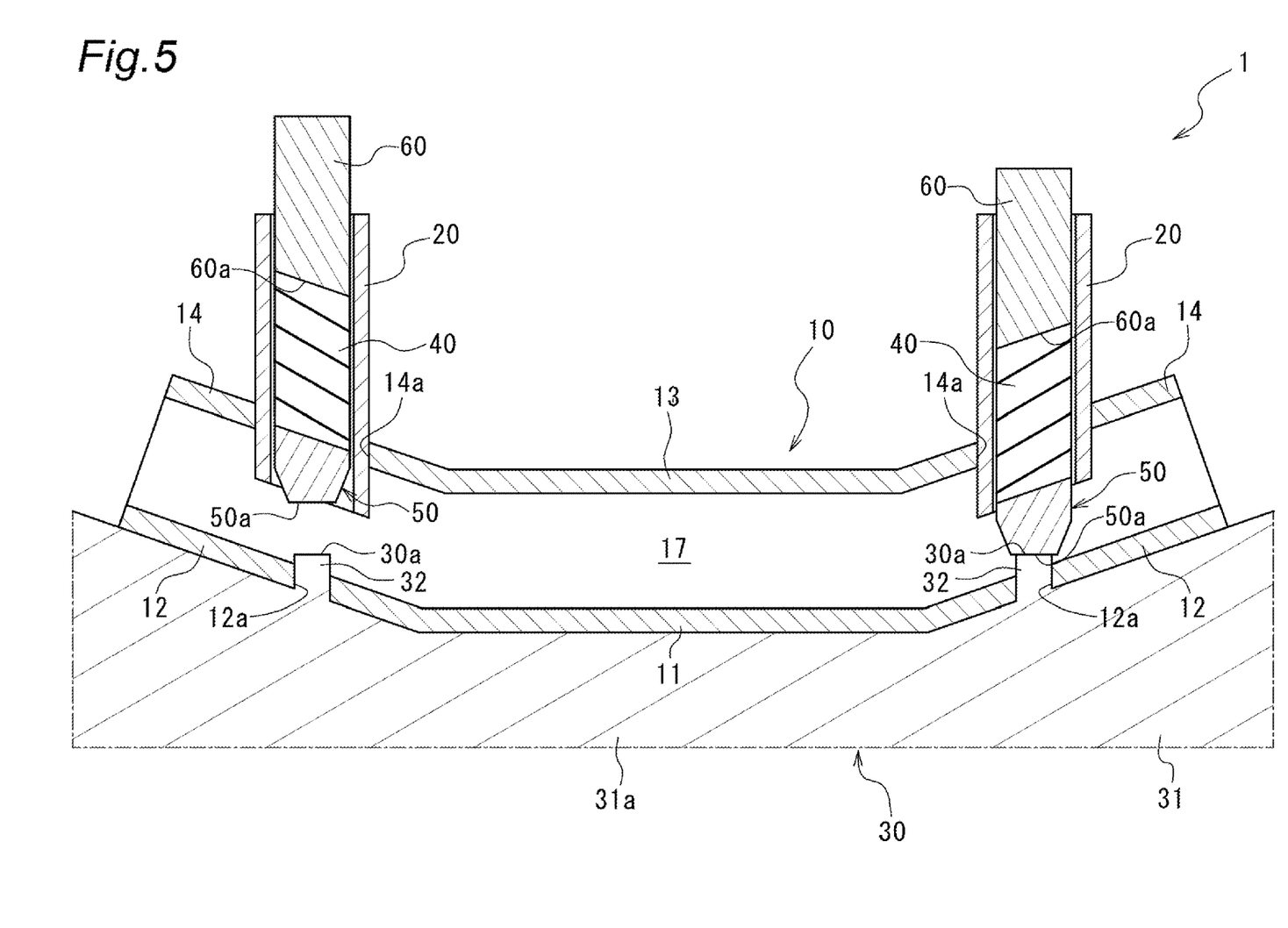
FIG. 5 is a cross-sectional view of a bumper reinforcement according to a modification of the first embodiment before swaging and joining.

FIG. 5 is a cross-sectional view similar to FIG. 1 according to a modification of the first embodiment. As illustrated in FIG. 5, the pin 32 may be provided integrally with the die body 31.

Second Embodiment

A second embodiment is similar to the first embodiment except that a die 130 is not provided with the pin 32 (illustrated in FIG. 1). In the second embodiment, components similar to those in the first embodiment are denoted by the same reference numerals, and the detailed description thereof will be omitted.

Figure 6:
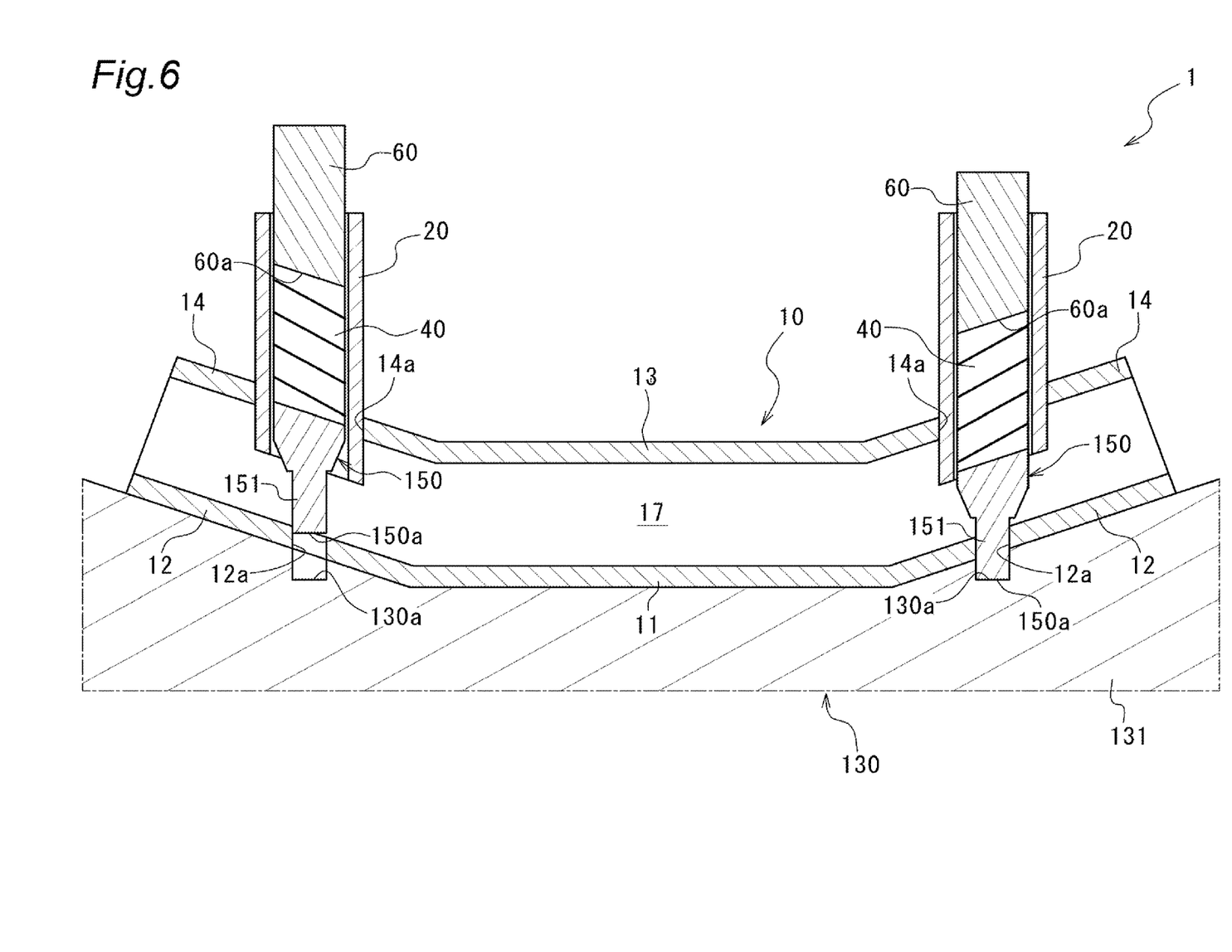
FIG. 6 is a cross-sectional view of a bumper reinforcement according to a second embodiment of the present invention before swaging and joining.

FIG. 6 is a cross-sectional view of the bumper reinforcement 1 according to the present embodiment before joining.

Referring to FIG. 6, a die body 131 of the die 130 has a support surface 130a for applying a force from the die 130 to the rubber 40 through the small diameter hole 12a of the bumper beam 10. The support surface 130a is provided to be recessed from the surface of the die body 131 facing the front inclined wall 12 of the bumper beam 10.

An end portion on one side (upper side in FIG. 6, that is, rubber 40 side) in the axial direction of a core 150 of the present embodiment has a flat surface inclined with respect to the axial direction so as to correspond to the shape of the end surface of the rubber 40. A columnar portion 151 having a columnar shape and extending in the axial direction is provided on the other side (in FIG. 6, lower side, that is, the die 30 side) in the axial direction of the core 150. An end portion on the other side in the axial direction of the columnar portion 151 has a pressing surface 150a perpendicular to the axial direction of the core 150 so as to correspond to the shape of the support surface 130a of the die 130. An outer shape of the columnar portion 151 is formed to be slightly smaller than a shape of the small diameter hole 12a to such an extent that the columnar portion 151 can pass through the small diameter hole 12a of the front inclined wall 12.

(Joining Method of Bumper Reinforcement 1)

Figure 7:
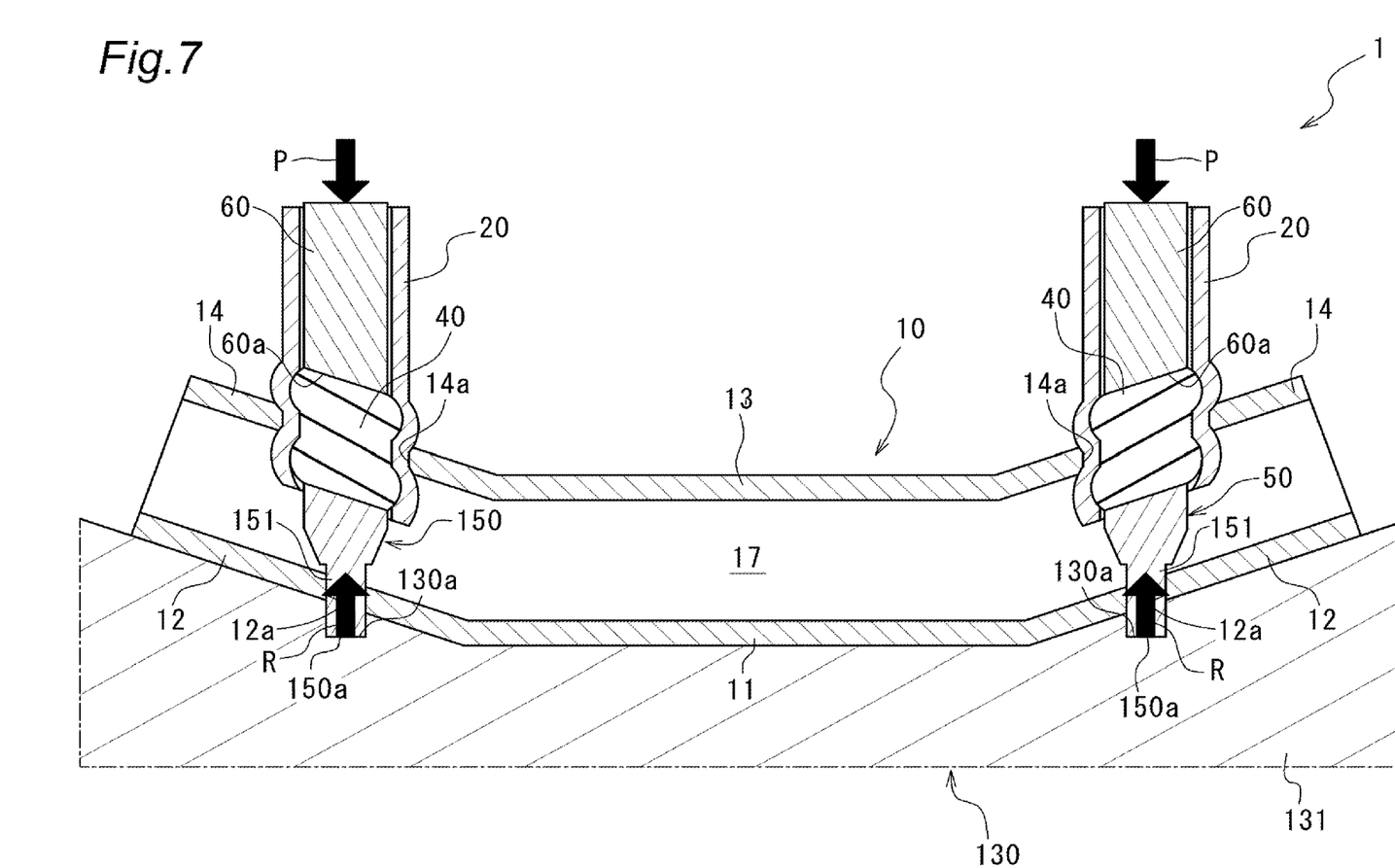
FIG. 7 is a cross-sectional view of the bumper reinforcement according to the second embodiment during swaging and joining.
Figure 8:
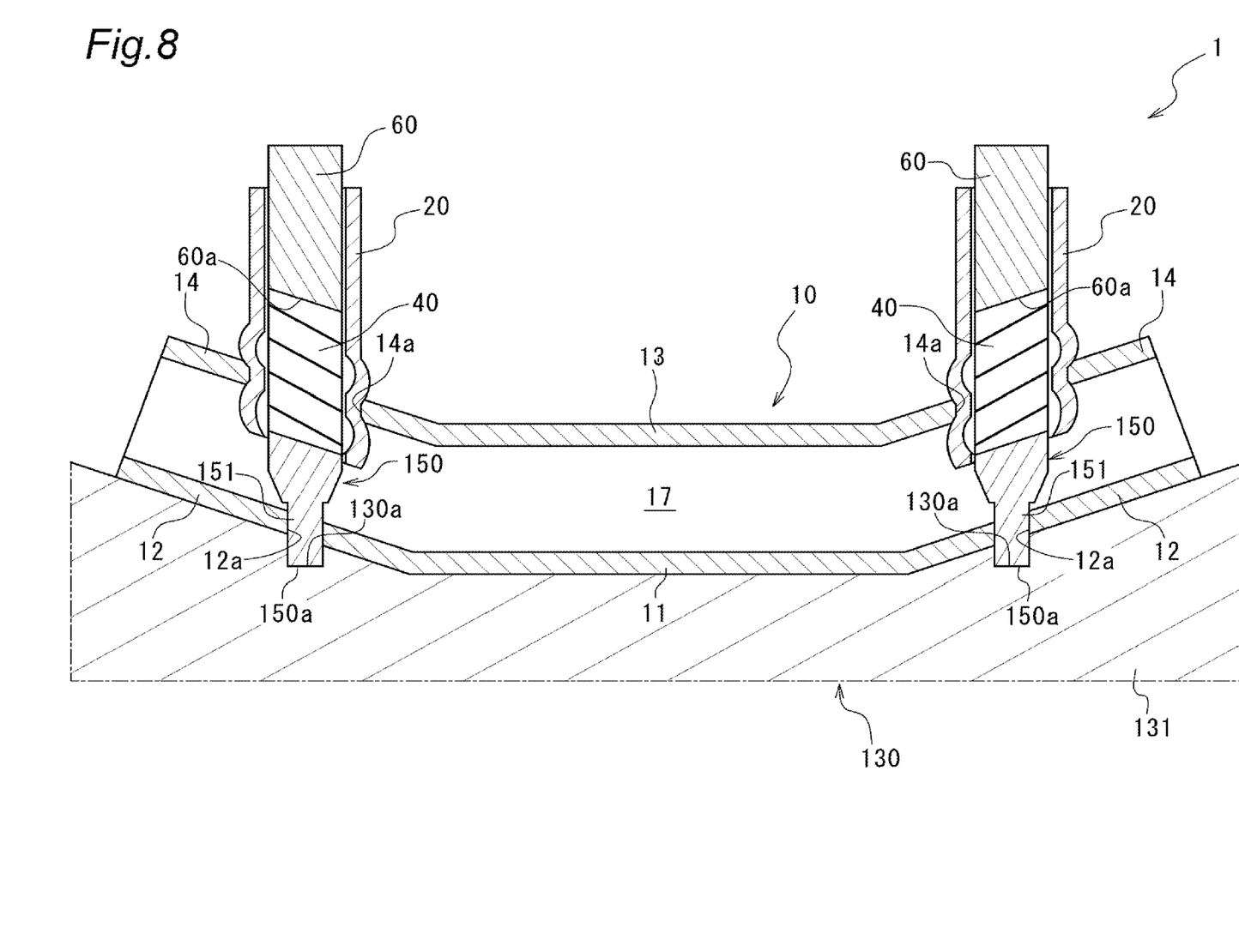
FIG. 8 is a cross-sectional view of the bumper reinforcement according to the second embodiment after swaging and joining.

A joining method of the bumper reinforcement 1 of the present embodiment will be described below with reference to FIGS. 6 to 8. FIG. 7 is a cross-sectional view of the bumper reinforcement 1 of the present embodiment during swaging and joining. FIG. 8 is a cross-sectional view of the bumper reinforcement 1 of the present embodiment after swaging and joining.

First, as illustrated in FIG. 6, the bumper beam 10, the bumper stay 20, the die 130, the rubber 40, the core 150, and the plunger 60 having the above-described structures are prepared. The bumper beam 10 is then disposed in the die 130. In this event, the small diameter hole 12a of the bumper beam 10 and the support surface 130a provided on the die body 131 are coaxially disposed. In the present embodiment, the support surface 130a is located outside the bumper beam 10.

Thereafter, the bumper stay 20 is inserted into the large diameter hole 14a of the bumper beam 10. In this event, the bumper stay 20 is inserted into the bumper beam 10 until the end portion on one side in the axial direction of the bumper stay 20 is located between the front inclined wall 12 and the rear inclined wall 14. In other words, the end portion on one side in the axial direction of the bumper stay 20 does not abut on the front inclined wall 12 of the bumper beam 10. Then, the core 150, the rubber 40, and the plunger 60 are inserted into the bumper stay 20. In this event, the support surface 130a of the die body 131 extends perpendicular to the axial direction of the bumper stay 20 and the axial direction of the rubber 40.

After the core 150, the rubber 40, and the plunger 60 are inserted into the bumper stay 20, as illustrated in FIG. 8, the rubber 40 is compressed in the axial direction by the core 150 and the plunger 60. When the rubber 40 is compressed in the axial direction (compression direction), the rubber 40 expands in a direction orthogonal to the compression direction, thereby the bumper stay 20 expands and deforms. The bumper stay 20 is swaged and joined to the rear inclined wall 14 of the bumper beam 10 by this expansion and deformation.

During the swaging and joining, a press load P in the axial direction of the bumper stay 20 is applied to the plunger 60 from a press device (not illustrated). On the other hand, the core 150 is supported by the support surface 130a of the die body 131. As a result, a reaction force R corresponding to the press load P acts on the core 150 from the support surface 130a of the die body 131. The support surface 130a of the die body 131 is perpendicular to the axial direction of the rubber 40, and thus the reaction force R mainly includes the force of the axial component of the rubber 40. As a result of the press load P acting on the rubber 40 via the plunger 60 and the reaction force R from the support surface 130a acting on the rubber 40 via the core 150, a compressive force in the axial direction acts on the rubber 40.

After the swaging and joining, as illustrated in FIG. 8, the compression of the rubber 40 by the plunger 60 and the core 150 is released. The rubber 40 released from the compression is restored to its original shape by its own elastic force. Thus, the rubber 40 can be easily removed from the bumper stay 20.

The second embodiment has the same operational effects as those of the first embodiment.

Although specific embodiments of the present invention and modifications thereof have been described above, the present invention is not limited to the above embodiments, and various modifications can be made within the scope of the present invention.

While in the first embodiment and the second embodiment, the rubber, the core, and the plunger are integrated structure, the present invention is not limited thereto, and the rubber, the core, and the plunger may be separately provided.

While in the first embodiment and the second embodiment, the joining method of the bumper reinforcement has been described as an example of the joining method of the structure according to the present invention, the present invention is not limited thereto and can be applied to joining of other structures.

The invention claimed is:

1. A joining method of a structure, the joining method comprising:
    preparing a first member including a first portion provided with a first hole and a second portion provided with a second hole facing the first hole, a second member that is hollow, a die having a shape corresponding to a shape of the second portion of the first member such that the die is fitted to the second portion of the first member, and an elastic member;
    disposing the first member in the die;
    inserting the second member into the first hole of the first member;
    inserting the elastic member into the second member; and
    in a state where one end of the second member in an axial direction is located between the first portion and the second portion of the first member, compressing the elastic member in the axial direction to expand the elastic member in a direction orthogonal to the axial direction, thereby expanding and deforming the second member at a portion passing through the first hole of the first member to be swaged and joined to the first portion,
    wherein the die includes a support surface for applying a force from the die to the elastic member through the second hole, and
    the support surface is perpendicular to an axial direction of the elastic member.

2. The joining method of the structure according to claim 1,
    wherein the die includes:
    a die body; and
    a support member protruding from the die body and including the support surface,
    wherein the support member is inserted into the second hole when the first member is disposed in the die.

3. The joining method of the structure according to claim 1, the joining method further comprising:
    preparing a core member to be disposed between the elastic member and the support surface and integrated with the elastic member; and
    inserting the core member into the second member before the elastic member is inserted into the second member,
    wherein the core member is formed so as to be gradually thinner toward an end portion on a side of the support surface.

4. The joining method of the structure according to claim 1,
    wherein the first member is a bumper beam, and
    the second member is a bumper stay.

5. The joining method of the structure according to claim 1,
    wherein in the state where one end of the second member in an axial direction is located between the first portion and the second portion of the first member, the second member is spaced from the second portion and the second hole.

6. The joining method of the structure according to claim 1,
    wherein the second hole is smaller than the first hole.

* * * * *